US007941681B2

(12) United States Patent
Gooding et al.

(10) Patent No.: US 7,941,681 B2
(45) Date of Patent: May 10, 2011

(54) PROACTIVE POWER MANAGEMENT IN A PARALLEL COMPUTER

(75) Inventors: Thomas M. Gooding, Rochester, MN (US); Todd A. Inglett, Rochester, MN (US); Thomas A. Liebsch, Arlington, SD (US); Thomas E. Musta, Rochester, MN (US); Don D. Reed, Mantorville, MN (US)

(73) Assignee: International Business Machines Corporation, Armonk, NY (US)

( * ) Notice: Subject to any disclaimer, the term of this patent is extended or adjusted under 35 U.S.C. 154(b) by 732 days.

(21) Appl. No.: 11/840,711

(22) Filed: Aug. 17, 2007

(65) Prior Publication Data

US 2009/0049313 A1 Feb. 19, 2009

(51) Int. Cl.
*G06F 1/32* (2006.01)
(52) U.S. Cl. ........................................ 713/320; 713/300
(58) Field of Classification Search .................. 713/320, 713/300
See application file for complete search history.

(56) References Cited

U.S. PATENT DOCUMENTS

| 5,717,319 | A  | * | 2/1998  | Jokinen .................. 323/280 |
| 6,472,848 | B2 |   | 10/2002 | Stryker et al. |
| 6,891,736 | B2 | * | 5/2005  | Takemura et al. .............. 363/65 |
| 2005/0125701 | A1 |  | 6/2005  | Van Hensbergen et al. |
| 2006/0288241 | A1 | * | 12/2006 | Felter et al. .................. 713/300 |

FOREIGN PATENT DOCUMENTS

| EP | 1715405 A1 | 10/2006 |
| JP | 08-221160 | 8/1996 |
| JP | 2000-155626 | 6/2000 |
| JP | 2001-125691 | 5/2001 |
| JP | 2002304239 A | 10/2002 |
| JP | 2005-073231 | 3/2005 |
| JP | 2007102323 A | 4/2007 |
| WO | WO 2006/011189 A1 | 2/2006 |

OTHER PUBLICATIONS

Yuan, Xie et al, "Temperature-Aware Task Allocation and Scheduling for Embedded Multiprocessor Systems-on-Chip (MPSoC) Design", The Journal of VLSI Signal Processing, Kluwer Academic Publishers, BO, vol. 45, No. 3, Dec. 5, 2006, pp. 177-189.

* cited by examiner

*Primary Examiner* — Nitin C Patel
(74) *Attorney, Agent, or Firm* — Biggers & Ohanian, LLP

(57) ABSTRACT

Proactive power management in a parallel computer, the parallel computer including a service node and a plurality of compute nodes, the service node connected to the compute nodes through an out-of-band service network, each compute node including a computer processor and a computer memory operatively coupled to the computer processor. Embodiments include receiving, by the service node, a user instruction to initiate a job on an operational group of compute nodes in the parallel computer, the instruction including power management attributes for the compute nodes; setting, by the service node in accordance with the power management attributes for the compute nodes of the operational group, power consumption ratios for each compute node of the operational group including a computer processor power consumption ratio and a computer memory power consumption ratio; and initiating, by the service node, the job on the compute nodes of the operational group of the parallel computer.

21 Claims, 8 Drawing Sheets

PROACTIVE POWER MANAGEMENT IN A PARALLEL COMPUTER

BACKGROUND OF THE INVENTION

1. Field of the Invention

The field of the invention is data processing, or, more specifically, methods, apparatus, and products for proactive power management in a parallel computer.

2. Description Of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

Parallel computing is an area of computer technology that has experienced advances. Parallel computing is the simultaneous execution of the same task (split up and specially adapted) on multiple processors in order to obtain results faster. Parallel computing is based on the fact that the process of solving a problem usually can be divided into smaller tasks, which may be carried out simultaneously with some coordination.

Parallel computers execute parallel algorithms. A parallel algorithm can be split up to be executed a piece at a time on many different processing devices, and then put back together again at the end to get a data processing result. Some algorithms are easy to divide up into pieces. Splitting up the job of checking all of the numbers from one to a hundred thousand to see which are primes could be done, for example, by assigning a subset of the numbers to each available processor, and then putting the list of positive results back together. In this specification, the multiple processing devices that execute the individual pieces of a parallel program are referred to as 'compute nodes.' A parallel computer is composed of compute nodes and other processing nodes as well, including, for example, input/output ('I/O') nodes, and service nodes.

Parallel algorithms are valuable because it is faster to perform some kinds of large computing tasks via a parallel algorithm than it is via a serial (non-parallel) algorithm, because of the way modern processors work. It is far more difficult to construct a computer with a single fast processor than one with many slow processors with the same throughput. There are also certain theoretical limits to the potential speed of serial processors. On the other hand, every parallel algorithm has a serial part and so parallel algorithms have a saturation point. After that point adding more processors does not yield any more throughput but only increases the overhead and cost.

Parallel algorithms are designed also to optimize one more resource the data communications requirements among the nodes of a parallel computer. There are two ways parallel processors communicate, shared memory or message passing. Shared memory processing needs additional locking for the data and imposes the overhead of additional processor and bus cycles and also serializes some portion of the algorithm.

Message passing processing uses high-speed data communications networks and message buffers, but this communication adds transfer overhead on the data communications networks as well as additional memory need for message buffers and latency in the data communications among nodes. Designs of parallel computers use specially designed data communications links so that the communication overhead will be small but it is the parallel algorithm that decides the volume of the traffic.

Many data communications network architectures are used for message passing among nodes in parallel computers. Compute nodes may be organized in a network as a 'torus' or 'mesh,' for example. Also, compute nodes may be organized in a network as a tree. A torus network connects the nodes in a three-dimensional mesh with wrap around links. Every node is connected to its six neighbors through this torus network, and each node is addressed by its x,y,z coordinate in the mesh. In a tree network, the nodes typically are connected into a binary tree: each node has a parent, and two children (although some nodes may only have zero children or one child, depending on the hardware configuration). In computers that use a torus and a tree network, the two networks typically are implemented independently of one another, with separate routing circuits, separate physical links, and separate message buffers.

A torus network lends itself to point to point operations, but a tree network typically is inefficient in point to point communication. A tree network, however, does provide high bandwidth and low latency for certain collective operations, message passing operations where all compute nodes participate simultaneously.

Because a parallel computer may include many thousands of compute nodes operating simultaneously during a job, a parallel computer may consume a large amount of power. Electricity providers typically charge a customer at a higher rate than normal after the customer consumes an amount of power greater than a particular amount, the peak power amount. Parallel computers, due to the large number of compute nodes that operate simultaneously during a job, often consume more than the peak power amount. As such, readers will appreciate that room for improvement exists in proactive power management in a parallel computer.

SUMMARY OF THE INVENTION

Methods, service nodes, and products are disclosed for proactive power management in a parallel computer, the parallel computer including a service node and a plurality of compute nodes, the service node connected to the compute nodes through an out-of-band service network, each compute node including a computer processor and a computer memory operatively coupled to the computer processor. Embodiments include receiving, by the service node, a user instruction to initiate a job on an operational group of compute nodes in the parallel computer, the instruction including power management attributes for the compute nodes; setting, by the service node in accordance with the power management attributes for the compute nodes of the operational group, power consumption ratios for each compute node of the operational group including a computer processor power consumption ratio and a computer memory power consumption ratio; and initiating, by the service node, the job on the compute nodes of the operational group of the parallel computer.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
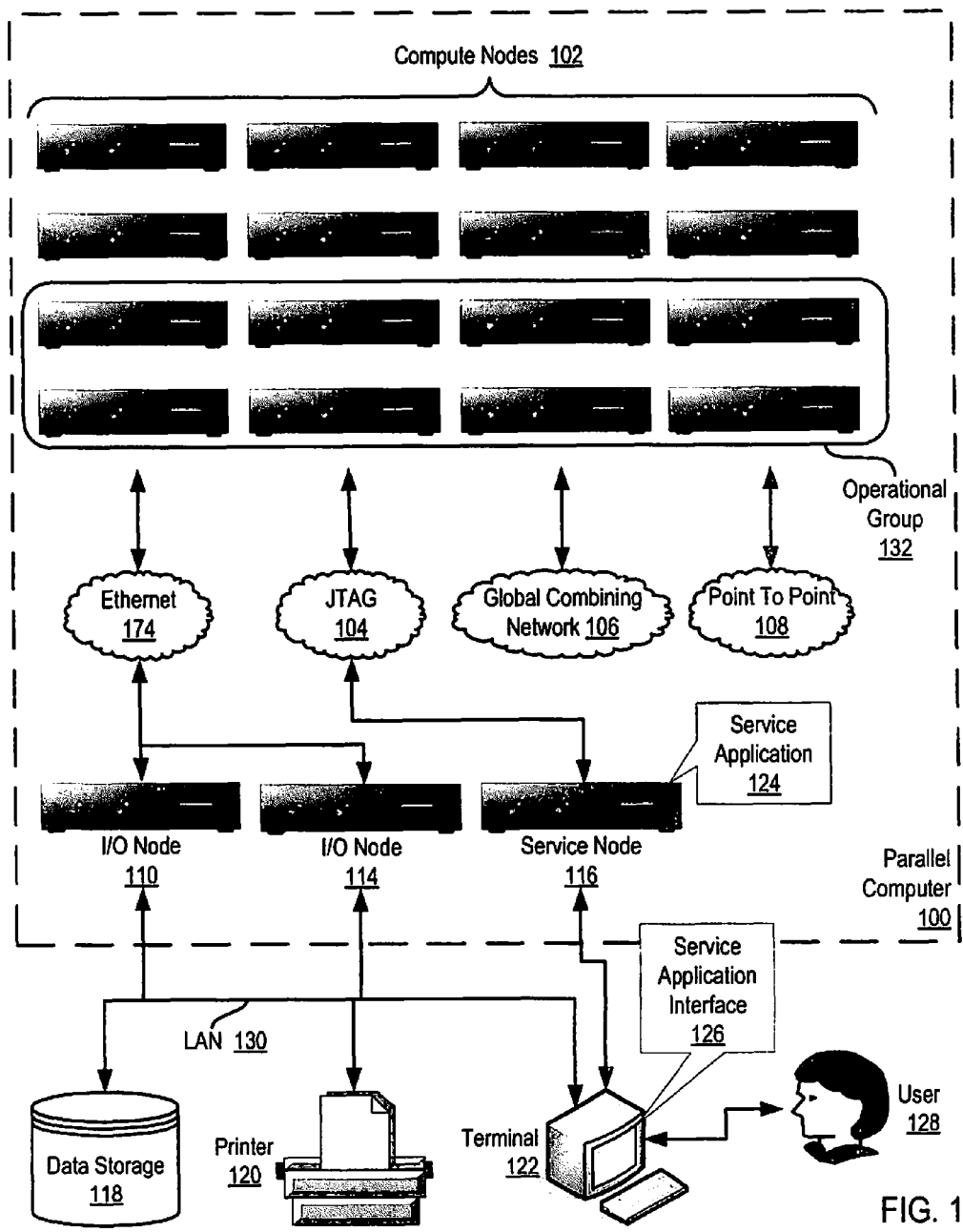
FIG. 1 illustrates an exemplary system for proactive power management in a parallel computer according to embodiments of the present invention.

Exemplary methods, apparatus, and computer program products for proactive power management in a parallel computer according to embodiments of the present invention are described with reference to the accompanying drawings, beginning with FIG. 1. FIG. 1 illustrates an exemplary system for proactive power management in a parallel computer according to embodiments of the present invention. The system of FIG. 1 includes a parallel computer (100), non-volatile memory for the computer in the form of data storage device (118), an output device for the computer in the form of printer (120), and an input/output device for the computer in the form of computer terminal (122). Parallel computer (100) in the example of FIG. 1 includes a plurality of compute nodes (102).

The compute nodes (102) are coupled for data communications by several independent data communications networks including a high speed Ethernet network (174), a Joint Test Action Group ('JTAG') network (104), a global combining network (106) which is optimized for collective operations, and a torus network (108) which is optimized for point to point operations. The global combining network (106) is a data communications network that includes data communications links connected to the compute nodes so as to organize the compute nodes as a tree. Each data communications network is implemented with data communications links among the compute nodes (102). The data communications links provide data communications for parallel operations among the compute nodes of the parallel computer.

In addition, the compute nodes (102) of parallel computer are organized into at least one operational group (132) of compute nodes. An operational group of compute nodes is a subset of all compute nodes in the parallel computer that participate in carrying out a job. Operational groups may be configured for collective parallel operations or point-to-point operations.

Collective operations are implemented with data communications among the compute nodes of an operational group. Collective operations are those functions that involve all the compute nodes of an operational group. A collective operation is an operation, a message-passing computer program instruction that is executed simultaneously, that is, at approximately the same time, by all the compute nodes in an operational group of compute nodes. Such an operational group may include all the compute nodes in a parallel computer (100) or a subset all the compute nodes. Collective operations are often built around point to point operations. A collective operation requires that all processes on all compute nodes within an operational group call the same collective operation with matching arguments. A 'broadcast' is an example of a collective operation for moving data among compute nodes of an operational group. A 'reduce' operation is an example of a collective operation that executes arithmetic or logical functions on data distributed among the compute nodes of an operational group. An operational group may be implemented as, for example, an MPI 'communicator.'

'MPI' refers to 'Message Passing Interface,' a prior art parallel communications library, a module of computer program instructions for data communications on parallel computers. Examples of prior-art parallel communications libraries that may be improved for use with systems according to embodiments of the present invention include MPI and the 'Parallel Virtual Machine' ('PVM') library. PVM was developed by the University of Tennessee, The Oak Ridge National Laboratory, and Emory University. MPI is promulgated by the MPI Forum, an open group with representatives from many organizations that define and maintain the MPI standard. MPI at the time of this writing is a de facto standard for communication among compute nodes running a parallel program on a distributed memory parallel computer. This specification sometimes uses MPI terminology for ease of explanation, although the use of MPI as such is not a requirement or limitation of the present invention.

Some collective operations have a single originating or receiving process running on a particular compute node in an operational group. For example, in a 'broadcast' collective operation, the process on the compute node that distributes the data to all the other compute nodes is an originating process. In a 'gather' operation, for example, the process on the compute node that received all the data from the other compute nodes is a receiving process. The compute node on which such an originating or receiving process runs is referred to as a logical root.

Most collective operations are variations or combinations of four basic operations: broadcast, gather, scatter, and reduce. The interfaces for these collective operations are defined in the MPI standards promulgated by the MPI Forum. Algorithms for executing collective operations, however, are not defined in the MPI standards. In a broadcast operation, all processes specify the same root process, whose buffer contents will be sent. Processes other than the root specify receive buffers. After the operation, all buffers contain the message from the root process.

In a scatter operation, the logical root divides data on the root into segments and distributes a different segment to each compute node in the operational group. In scatter operation, all processes typically specify the same receive count. The send arguments are only significant to the root process, whose buffer actually contains sendcount * N elements of a given data type, where N is the number of processes in the given group of compute nodes. The send buffer is divided and dispersed to all processes (including the process on the logical root). Each compute node is assigned a sequential identifier termed a 'rank.' After the operation, the root has sent sendcount data elements to each process in increasing rank order. Rank 0 receives the first sendcount data elements from the send buffer. Rank 1 receives the second sendcount data elements from the send buffer, and so on.

A gather operation is a many-to-one collective operation that is a complete reverse of the description of the scatter operation. That is, a gather is a many-to-one collective operation in which elements of a datatype are gathered from the ranked compute nodes into a receive buffer in a root node.

A reduce operation is also a many-to-one collective operation that includes an arithmetic or logical function performed on two data elements. All processes specify the same 'count' and the same arithmetic or logical function. After the reduction, all processes have sent count data elements from computer node send buffers to the root process. In a reduction operation, data elements from corresponding send buffer locations are combined pair-wise by arithmetic or logical operations to yield a single corresponding element in the root process's receive buffer. Application specific reduction operations can be defined at runtime. Parallel communications libraries may support predefined operations. MPI, for example, provides the following pre-defined reduction operations:

| | |
|---|---|
| MPI_MAX | maximum |
| MPI_MIN | minimum |
| MPI_SUM | sum |
| MPI_PROD | product |
| MPI_LAND | logical and |
| MPI_BAND | bitwise and |
| MPI_LOR | logical or |
| MPI_BOR | bitwise or |
| MPI_LXOR | logical exclusive or |
| MPI_BXOR | bitwise exclusive or |

In addition to compute nodes, the parallel computer (100) includes input/output ('I/O') nodes (110, 114) coupled to compute nodes (102) through one of the data communications networks (174). The I/0 nodes (110, 114) provide I/O services between compute nodes (102) and I/O devices (118, 120, 122). I/O nodes (110, 114) are connected for data communications I/O devices (118, 120, 122) through local area network ('LAN') (130). The parallel computer (100) also includes a service node (116) coupled to the compute nodes through one of the networks (104). Service node (116) provides service common to pluralities of compute nodes, loading programs into the compute nodes, starting program execution on the compute nodes, retrieving results of program operations on the computer nodes, and so on. Service node (116) runs a service application (124) and communicates with users (128) through a service application interface (126) that runs on computer terminal (122).

As described in more detail below in this specification, the system of FIG. 1 operates generally for proactive power management in a parallel computer according to embodiments of the present invention. Power management in a parallel computer according to embodiments of the present invention is generally described as proactive because power is managed in anticipation of future problems, needs, or changes in the parallel computer. Such proactive management is in contrast with reactive power management, power management that does not anticipate future problems, needs, or changes in the parallel computer. The system of FIG. 1 is capable of receiving, by the service node (116), a user (128) instruction to initiate a job on an operational group (132) of compute nodes (102) in the parallel computer (100); setting, by the service node (116) in accordance with the power management attributes for the compute nodes (102) of the operational group (132), power consumption ratios for each compute node (102) of the operational group (132) including a computer processor power consumption ratio and a computer memory power consumption ratio; and initiating, by the service node (116), the job on the compute nodes (102) of the operational group (132) of the parallel computer (100).

A job to be carried out by a parallel computer is an instance of the execution of an application. Such an application includes computer program instructions for each compute node in an operational group. Carrying out a job, then, includes executing the computer program instructions of an application.

A user instruction to initiate such a job includes power management attributes for the compute nodes. Power management attributes are parameters used by a service node to administer the variable power consumption functionality of one or more compute nodes of an operational group. Typical compute nodes according to the example of FIG. 1 allow for power consumption of the processors to vary from job to job and allow for power consumption of the memory to vary from job to job. Power management attributes according to embodiments of the present invention include power consumption ratios and a length of time for idle cycles for compute nodes in an operational group of the parallel computer. Power consumption ratios are parameters for controlling a compute node's power consumption during execution of computer program instructions. Power consumption ratios include a computer processor power consumption ratio and a computer memory power consumption ratio. Each ratio is expressed as a ratio of execution cycles to idle cycles. An execution cycle is the period in which the computer memory or computer processor executes an instruction. That is, an execution cycle is the period in which the computer memory or computer processor is active. An idle cycle, in contrast, is a period in which the computer processor or computer memory is idle, that is, not executing any instruction. When idling, neither the computer processor nor the computer memory is consuming power.

As mentioned above, power management attributes also include a length of time for the idle cycles. The greater the length of time of an idle cycle the longer a computer processor or computer memory in a compute node idles during such an idle cycle. A service node may set the length of time for the idle cycles when setting the power consumption ratios.

Power management attributes may be job-specific. That is, a user may provide a particular set of power management attributes for one job and a completely different set of power management attributes for another job. In the alternative, a user may provide one set of power management attributes for a group of jobs or provide a set of power management attributes to be applied on a rules basis. A user may, for example, provide one set of power management attributes to be applied for all jobs performed during summer months and one set of power management attributes to be applied during the rest of the year.

The service node (116) of FIG. 1 includes a service application (124), a module of computer program instructions capable of receiving, by the service node (116), a user (128) instruction to initiate a job on an operational group (132) of compute nodes (102) in the parallel computer (100), the instruction including power management attributes for the compute nodes. Receiving a user instruction to initiate a job on an operational group of compute nodes in the parallel computer (100) may be carried out by receiving the power management attributes, entered by the user (128) through a graphical user interface ('GUI') provided by the service application interface (126), from the terminal (122). Such a GUI may be specifically configured to accept a length of time for idle cycles in addition to a single ratio of execute cycles to idle cycles to be applied to both the computer processor and computer memory power consumption ratios. Alternatively the GUI may be specifically configured to accept a length of time for idle cycles in addition to two distinct ratios of execute cycles to idle cycles: one ratio to be set as the computer processor power consumption ratio and one ratio to be set as the computer memory power consumption ratio.

The service application (124) of FIG. 1 also includes computer program instructions capable of setting, by the service node (116) in accordance with the power management attributes for the compute nodes (102) of the operational group, power consumption ratios for each compute node of the operational group including a computer processor power consumption ratio and a computer memory power consumption ratio. Setting power consumption ratios for each compute node (102) of the operational group (132) may be carried out by configuring each of the compute nodes (102) in the operational group (132) with the power consumption ratios. That is, configuring computer memory within each of the compute nodes with the power consumption ratios.

In the system of FIG. 1, the exemplary service node (116) sets the power management attributes through an out-of band service network, the JTAG network (104). Although the service network of FIG. 1 is depicted as a JTAG network readers of skill in the art will recognize that the service network may be implemented as any communication link capable enabling of out-of-band communication between the service node (116) and the compute nodes (102). Such out-of-band communication links may include, for example, an Inter-Integrated Circuit ('I²C') bus, a 1-Wire bus, a Peripheral Component Interconnect ('PCI') bus, a System Management Bus ('SMB'), a serial peripheral interface ('SPI'), an Intelligent platform management bus ('IPMB'), and so on as will occur to those of skill in the art.

The service application (124) of FIG. 1 also includes computer program instructions capable of initiating, by the service node (116), the job on the compute nodes (102) of the operational group (132) of the parallel computer (100). Initiating the job on the compute nodes (102) of the operational group (132) of the parallel computer (100) may be carried out by configuring each compute node (102) in the operational group (132) with its job-specific computer program instructions and sending a notification to the compute nodes (102) in the operational group (132) to execute the computer program instructions.

The arrangement of nodes, networks, and I/O devices making up the exemplary system illustrated in FIG. 1 are for explanation only, not for limitation of the present invention. Data processing systems capable of proactive power management in a parallel computer according to embodiments of the present invention may include additional nodes, networks, devices, and architectures, not shown in FIG. 1, as will occur to those of skill in the art. Although the parallel computer (100) in the example of FIG. 1 includes sixteen compute nodes (102), readers will note that parallel computers capable of proactive power management in a parallel computer according to embodiments of the present invention may include any number of compute nodes. In addition to Ethernet and JTAG, networks in such data processing systems may support many data communications protocols including for example TCP (Transmission Control Protocol), IP (Internet Protocol), and others as will occur to those of skill in the art. Various embodiments of the present invention may be implemented on a variety of hardware platforms in addition to those illustrated in FIG. 1.

Proactive power management in a parallel computer according to embodiments of the present invention may be implemented on a parallel computer that includes a plurality of compute nodes. In fact, such computers may include thousands of such compute nodes. Each compute node is in turn itself a kind of computer composed of one or more computer processors, its own computer memory, and its own input/output adapters. For further explanation, therefore, FIG. 2 sets forth a block diagram of an exemplary compute node useful in proactive power management in a parallel computer according to embodiments of the present invention. The compute node (152) of FIG. 2 includes one or more computer processors (164) as well as random access memory ('RAM') (156). The processors (164) are connected to RAM (156) through a high-speed memory bus (154) and through a bus adapter (194) and an extension bus (168) to other components of the compute node (152). Stored in RAM (156) is an application program (158), a module of computer program instructions that carries out parallel, user-level data processing using parallel algorithms. The application (158) of FIG. 2 allocates an application buffer for storing a message for transmission to another compute node.

Also stored in RAM (156) is a messaging module (160), a library of computer program instructions that carry out parallel communications among compute nodes, including point to point operations as well as collective operations. Application program (158) executes collective operations by calling software routines in the messaging module (160). A library of parallel communications routines may be developed from scratch for use in systems according to embodiments of the present invention, using a traditional programming language such as the C programming language, and using traditional programming methods to write parallel communications routines that send and receive data among nodes on two independent data communications networks. Alternatively, existing prior art libraries may be improved to operate according to embodiments of the present invention. Examples of prior-art parallel communications libraries include the 'Message Passing Interface' ('MPI') library and the 'Parallel Virtual Machine' ('PVM') library.

Also stored in RAM (156) is an operating system (162), a module of computer program instructions and routines for an application program's access to other resources of the compute node. It is typical for an application program and parallel communications library in a compute node of a parallel computer to run a single thread of execution with no user login and no security issues because the thread is entitled to complete access to all resources of the node. The quantity and complexity of tasks to be performed by an operating system on a compute node in a parallel computer therefore are smaller and less complex than those of an operating system on a serial computer with many threads running simultaneously. In addition, there is no video I/O on the compute node (152) of FIG. 2, another factor that decreases the demands on the operating system. The operating system may therefore be quite lightweight by comparison with operating systems of general purpose computers, a pared down version as it were, or an operating system developed specifically for operations on a particular parallel computer. Operating systems that may usefully be improved, simplified, for use in a compute node include UNIX™, Linux™, Microsoft XP™, AIX™, IBM's i5/OS™, and others as will occur to those of skill in the art.

Also stored in RAM (156) are power consumption ratios (712) including a computer processor power consumption ratio (714) and a computer memory power consumption ratio (716). Power consumption ratios are parameters for controlling a compute node's power consumption during execution of computer program instructions. The power consumption ratios (712) are set by a service node. The compute node (156), during the execution of the application (158), operates in accordance with the power consumption ratios (712).

Figure 2:
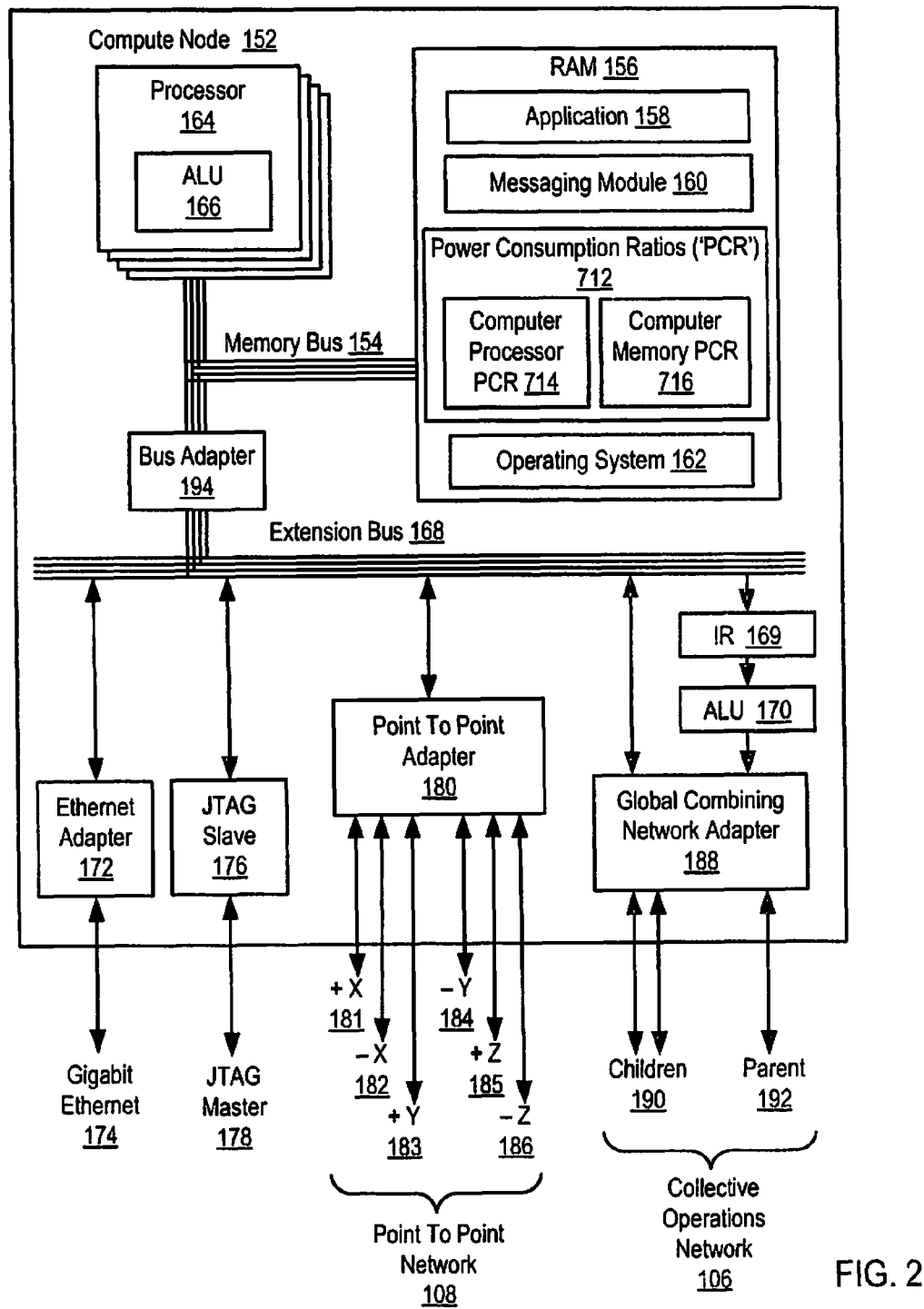
FIG. 2 sets forth a block diagram of an exemplary compute node useful in proactive power management in a parallel computer according to embodiments of the present invention.

The exemplary compute node (152) of FIG. 2 includes several communications adapters (172, 176, 180, 188) for implementing data communications with other nodes of a parallel computer. Such data communications may be carried out serially through RS-232 connections, through external buses such as USB, through data communications networks such as IP networks, and in other ways as will occur to those of skill in the art. Communications adapters implement the hardware level of data communications through which one computer sends data communications to another computer, directly or through a network. Examples of communications adapters useful in systems for proactive power management in a parallel computer according to embodiments of the present invention include modems for wired communications, Ethernet (IEEE 802.3) adapters for wired network communications, and 802.11b adapters for wireless network communications.

The data communications adapters in the example of FIG. 2 include a Gigabit Ethernet adapter (172) that couples example compute node (152) for data communications to a Gigabit Ethernet (174). Gigabit Ethernet is a network transmission standard, defined in the IEEE 802.3 standard, that provides a data rate of 1 billion bits per second (one gigabit). Gigabit Ethernet is a variant of Ethernet that operates over multimode fiber optic cable, single mode fiber optic cable, or unshielded twisted pair.

The data communications adapters in the example of FIG. 2 includes a JTAG Slave circuit (176) that couples example compute node (152) for data communications to a JTAG Master circuit (178). JTAG is the usual name used for the IEEE 1149.1 standard entitled Standard Test Access Port and Boundary-Scan Architecture for test access ports used for testing printed circuit boards using boundary scan. JTAG is so widely adapted that, at this time, boundary scan is more or less synonymous with JTAG. JTAG is used not only for printed circuit boards, but also for conducting boundary scans of integrated circuits, and is also useful as a mechanism for debugging embedded systems, providing a convenient "back door" into the system. The example compute node of FIG. 2 may be all three of these: It typically includes one or more integrated circuits installed on a printed circuit board and may be implemented as an embedded system having its own processor, its own memory, and its own I/O capability. JTAG boundary scans through JTAG Slave (176) may efficiently configure processor registers and memory in compute node (152) for use in proactive power management in a parallel computer according to embodiments of the present invention.

The data communications adapters in the example of FIG. 2 includes a Point To Point Adapter (180) that couples example compute node (152) for data communications to a network (108) that is optimal for point to point message passing operations such as, for example, a network configured as a three-dimensional torus or mesh. Point To Point Adapter (180) provides data communications in six directions on three communications axes, x, y, and z, through six bidirectional links: +x (181), −x (182), +y (183), −y (184), +z (185), and −z (186).

The data communications adapters in the example of FIG. 2 includes a Global Combining Network Adapter (188) that couples example compute node (152) for data communications to a network (106) that is optimal for collective message passing operations on a global combining network configured, for example, as a binary tree. The Global Combining Network Adapter (188) provides data communications through three bidirectional links: two to children nodes (190) and one to a parent node (192).

Example compute node (152) includes two arithmetic logic units ('ALUs'). ALU (166) is a component of processor (164), and a separate ALU (170) is dedicated to the exclusive use of Global Combining Network Adapter (188) for use in performing the arithmetic and logical functions of reduction operations. Computer program instructions of a reduction routine in parallel communications library (160) may latch an instruction for an arithmetic or logical function into instruction register (169). When the arithmetic or logical function of a reduction operation is a 'sum' or a 'logical or,' for example, Global Combining Network Adapter (188) may execute the arithmetic or logical operation by use of ALU (166) in processor (164) or, typically much faster, by use dedicated ALU (170).

Figure 3:
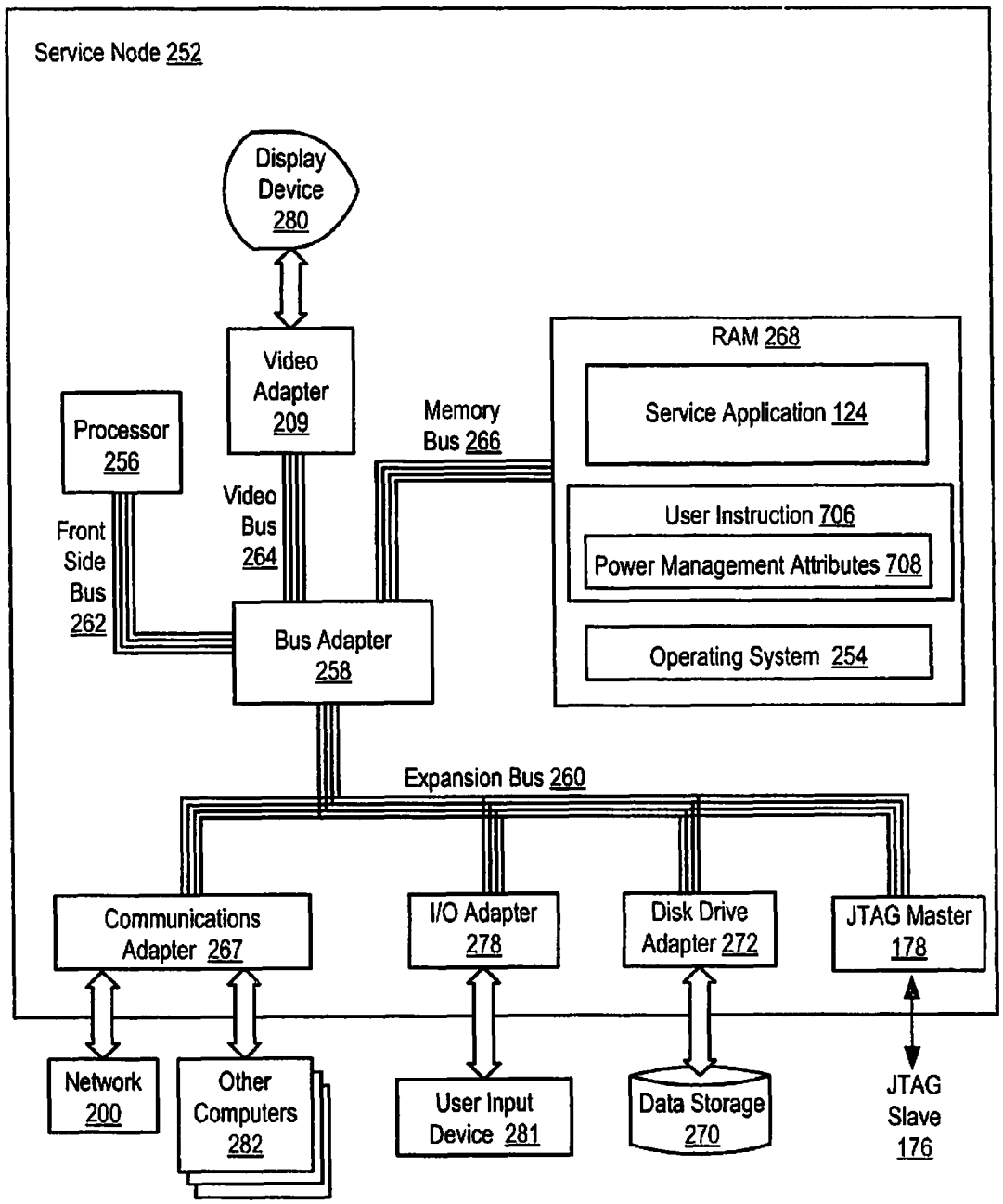
FIG. 3 sets forth a block diagram of automated computing machinery comprising an exemplary service node useful in proactive power management in a parallel computer according to embodiments of the present invention.

For further explanation, therefore, FIG. 3 sets forth a block diagram of automated computing machinery comprising an exemplary service node (252) useful in proactive power management in a parallel computer according to embodiments of the present invention. The service node (252) of FIG. 3 includes at least one computer processor (256) or 'CPU' as well as random access memory (268) ('RAM') which is connected through a high speed memory bus (266) and bus adapter (268) to processor (256) and to other components of the service node.

Stored in RAM (268) is service application (124), a module of computer program instructions capable of proactively managing power in a parallel computer according to embodiments of the present invention. The service application (124) of FIG. 3 includes computer program instructions capable of receiving, by the service node (252), a user instruction (706) to initiate a job on an operational group of compute nodes in the parallel computer, the instruction including power management attributes (708) for the compute nodes, setting, by the service node in accordance with the power management attributes for the compute nodes of the operational group, power consumption ratios for each compute node of the operational group including a computer processor power consumption ratio and a computer memory power consumption ratio; and initiating, by the service node, the job on the compute nodes of the operational group of the parallel computer.

Also stored in RAM (268) is an operating system (254). Operating systems useful in service nodes according to embodiments of the present invention include UNIX™, Linux™, Microsoft Vista™, Microsoft XP™, AIX™, IBM's i5/OS™, and others as will occur to those of skill in the art. Operating system (254) and the media server application program (202) in the example of FIG. 3 are shown in RAM (268), but many components of such software typically are stored in non-volatile memory also, for example, on a disk drive (270).

The service node (252) of FIG. 3 includes a bus adapter (268), a computer hardware component that contains drive electronics for the high speed buses, the front side bus (262), the video bus (264), and the memory bus (266), as well as drive electronics for the slower expansion bus (260). Examples of bus adapters useful for proactive power management in a parallel computer according to embodiments of the present invention include the Intel Northbridge, the Intel Memory Controller Hub, the Intel Southbridge, and the Intel I/O Controller Hub. Examples of expansion buses useful for proactive power management in a parallel computer according to embodiments of the present invention include Industry Standard Architecture ('ISA') buses and Peripheral Component Interconnect ('PCI') buses.

The service node (252) of FIG. 3 includes disk drive adapter (272) coupled through expansion bus (260) and bus adapter (268) to processor (256) and other components of the service node (252). Disk drive adapter (272) connects non-volatile data storage to the service node (252) in the form of disk drive (270). Disk drive adapters useful in service nodes include Integrated Drive Electronics ('IDE') adapters, Small Computer System Interface ('SCSI') adapters, and others as will occur to those of skill in the art. In addition, non-volatile computer memory may be implemented for a service node as an optical disk drive, electrically erasable programmable read-only memory (so-called 'EEPROM' or 'Flash' memory), RAM drives, and so on, as will occur to those of skill in the art.

The example service node (252) of FIG. 3 includes one or more input/output ('I/O') adapters (278). I/O adapters in service nodes implement user-oriented input/output through, for example, software drivers and computer hardware for controlling output to display devices such as computer display screens, as well as user input from user input devices (281) such as keyboards and mice. The example service node (252) of FIG. 3 includes a video adapter (209), which is an example of an I/O adapter specially designed for graphic output to a display device (280) such as a display screen or computer monitor. Video adapter (209) is connected to processor (256) through a high speed video bus (264), bus adapter (268), and the front side bus (262), which is also a high speed bus.

The exemplary service node (252) of FIG. 3 includes a communications adapter (267) for data communications with other computers (282) and for data communications with a data communications network (200). Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful for proactive power management in a parallel computer according to embodiments of the present invention include modems for wired dial-up communications, Ethernet (IEEE 802.3) adapters for wired data communications network communications, and 802.11 adapters for wireless data communications network communications.

Figure 4A:
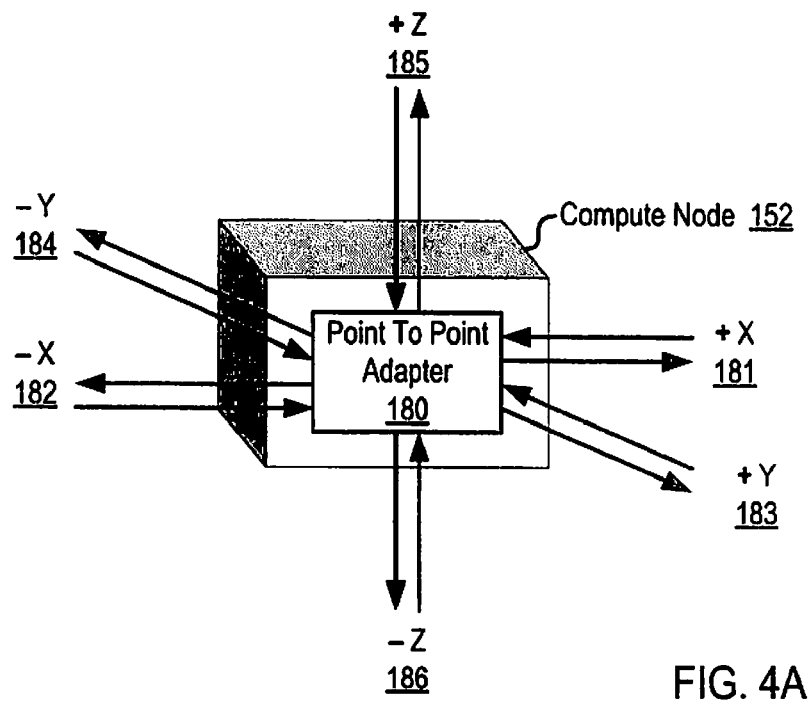
FIG. 4A illustrates an exemplary Point To Point Adapter useful in systems capable of proactive power management in a parallel computer according to embodiments of the present invention.

For further explanation, FIG. 4A illustrates an exemplary Point To Point Adapter (180) useful in systems capable of proactive power management in a parallel computer according to embodiments of the present invention. Point To Point Adapter (180) is designed for use in a data communications network optimized for point to point operations, a network that organizes compute nodes in a three-dimensional torus or mesh. Point To Point Adapter (180) in the example of FIG. 4A provides data communication along an x-axis through four unidirectional data communications links, to and from the next node in the −x direction (182) and to and from the next node in the +x direction (181). Point To Point Adapter (180) also provides data communication along a y-axis through four unidirectional data communications links, to and from the next node in the −y direction (184) and to and from the next node in the +y direction (183). Point To Point Adapter (180) in FIG. 4A also provides data communication along a z-axis through four unidirectional data communications links, to and from the next node in the −z direction (186) and to and from the next node in the +z direction (185).

Figure 4B:
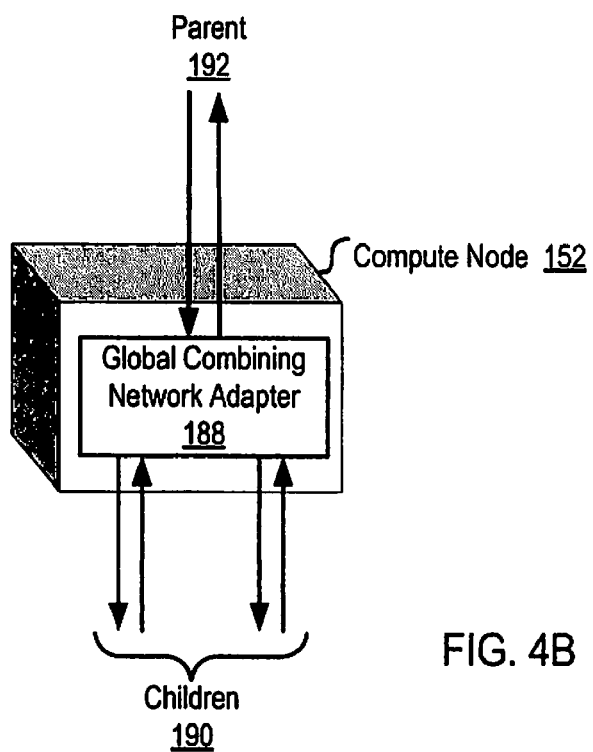
FIG. 4B illustrates an exemplary Global Combining Network Adapter useful in systems capable of proactive power management in a parallel computer according to embodiments of the present invention.

For further explanation, FIG. 4B illustrates an exemplary Global Combining Network Adapter (188) useful in systems capable of proactive power management in a parallel computer according to embodiments of the present invention. Global Combining Network Adapter (188) is designed for use in a network optimized for collective operations, a network that organizes compute nodes of a parallel computer in a binary tree. Global Combining Network Adapter (188) in the example of FIG. 4B provides data communication to and from two children nodes through four unidirectional data communications links (190). Global Combining Network Adapter (188) also provides data communication to and from a parent node through two unidirectional data communications links (192).

Figure 5:
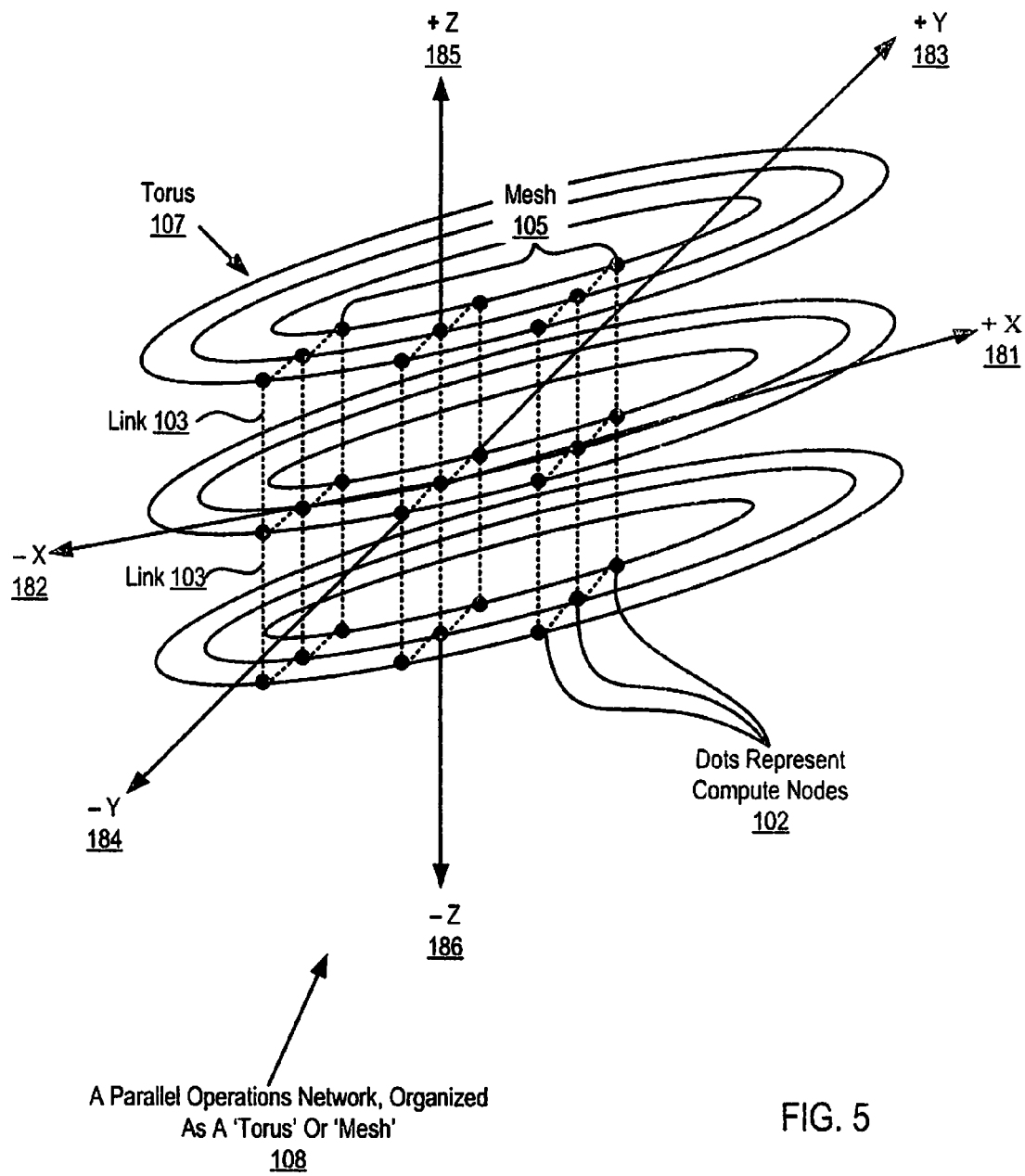
FIG. 5 sets forth a line drawing illustrating an exemplary data communications network optimized for point to point operations useful in systems capable of proactive power management in a parallel computer in accordance with embodiments of the present invention.

For further explanation, FIG. 5 sets forth a line drawing illustrating an exemplary data communications network (108) optimized for point to point operations useful in systems capable of proactive power management in a parallel computer in accordance with embodiments of the present invention. In the example of FIG. 5, dots represent compute nodes (102) of a parallel computer, and the dotted lines between the dots represent data communications links (103) between compute nodes. The data communications links (103) are implemented with point to point data communications adapters similar to the one illustrated for example in FIG. 4A, with data communications links on three axes, x, y, and z, and to and fro in six directions +x (181), −x (182), +y (183), −y (184), +z (185), and −z (186). The links and compute nodes are organized by this data communications network optimized for point to point operations into a three dimensional mesh (105). The mesh (105) has wrap-around links on each axis that connect the outermost compute nodes in the mesh (105) on opposite sides of the mesh (105). These wrap-around links form part of a torus (107). Each compute node in the torus has a location in the torus that is uniquely specified by a set of x, y, z coordinates. Readers will note that the wrap-around links in the y and z directions have been omitted for clarity, but are configured in a similar manner to the wrap-around link illustrated in the x direction. For clarity of explanation, the data communications network of FIG. 5 is illustrated with only 27 compute nodes, but readers will recognize that a data communications network optimized for point to point operations for use in proactive power management in a parallel computer in accordance with embodiments of the present invention may contain only a few compute nodes or may contain thousands of compute nodes.

Figure 6:
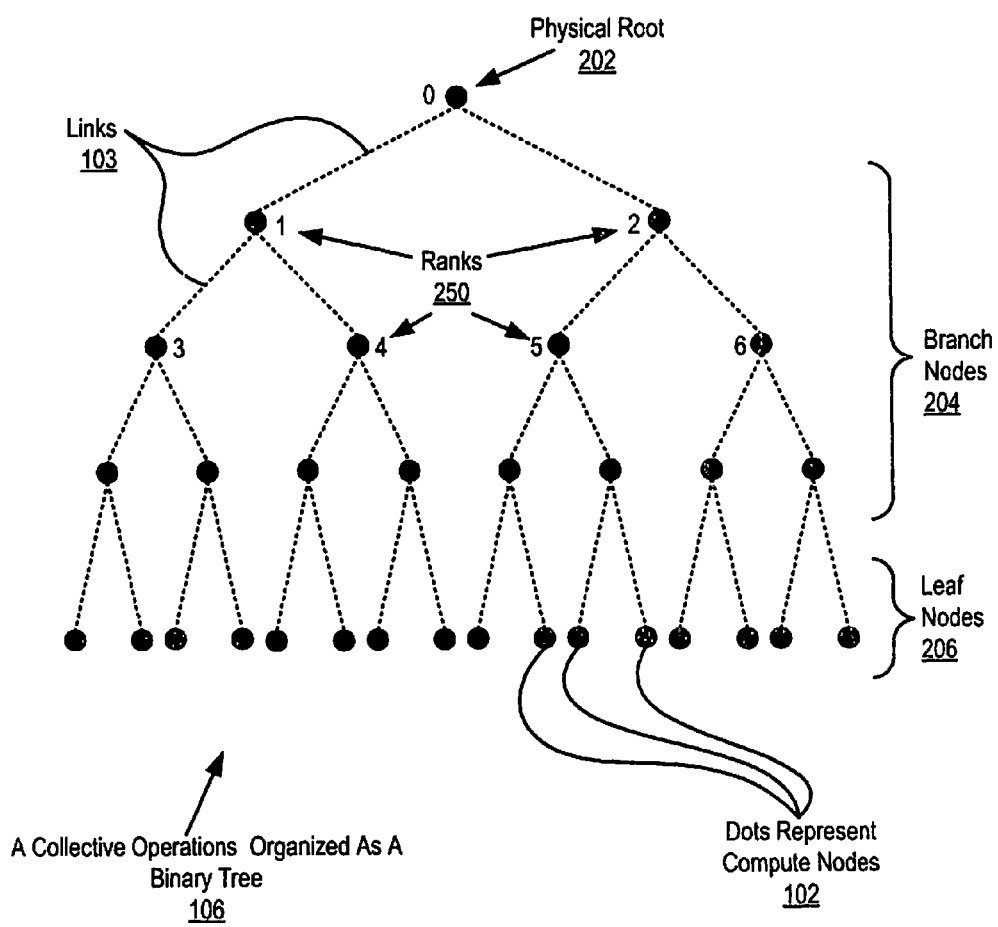
FIG. 6 sets forth a line drawing illustrating an exemplary data communications network optimized for collective operations useful in systems capable of proactive power management in a parallel computer in accordance with embodiments of the present invention.

For further explanation, FIG. 6 sets forth a line drawing illustrating an exemplary data communications network (106) optimized for collective operations useful in systems capable of proactive power management in a parallel computer in accordance with embodiments of the present invention. The example data communications network of FIG. 6 includes data communications links connected to the compute nodes so as to organize the compute nodes as a tree. In the example of FIG. 6, dots represent compute nodes (102) of a parallel computer, and the dotted lines (103) between the dots represent data communications links between compute nodes. The data communications links are implemented with global combining network adapters similar to the one illustrated for example in FIG. 4B, with each node typically providing data communications to and from two children nodes and data communications to and from a parent node, with some exceptions. Nodes in a binary tree (106) may be characterized as a physical root node (202), branch nodes (204), and leaf nodes (206). The root node (202) has two children but no parent. The leaf nodes (206) each has a parent, but leaf nodes have no children. The branch nodes (204) each has both a parent and two children. The links and compute nodes are thereby organized by this data communications network optimized for collective operations into a binary tree (106). For clarity of explanation, the data communications network of FIG. 6 is illustrated with only 31 compute nodes, but readers will recognize that a data communications network optimized for collective operations for use in systems for proactive power management in a parallel computer with embodiments of the present invention may contain only a few compute nodes or may contain thousands of compute nodes.

In the example of FIG. 6, each node in the tree is assigned a unit identifier referred to as a 'rank' (250). A node's rank uniquely identifies the node's location in the tree network for use in both point to point and collective operations in the tree network. The ranks in this example are assigned as integers beginning with 0 assigned to the root node (202), 1 assigned to the first node in the second layer of the tree, 2 assigned to the second node in the second layer of the tree, 3 assigned to the first node in the third layer of the tree, 4 assigned to the second node in the third layer of the tree, and so on. For ease of illustration, only the ranks of the first three layers of the tree are shown here, but all compute nodes in the tree network are assigned a unique rank.

Figure 7:
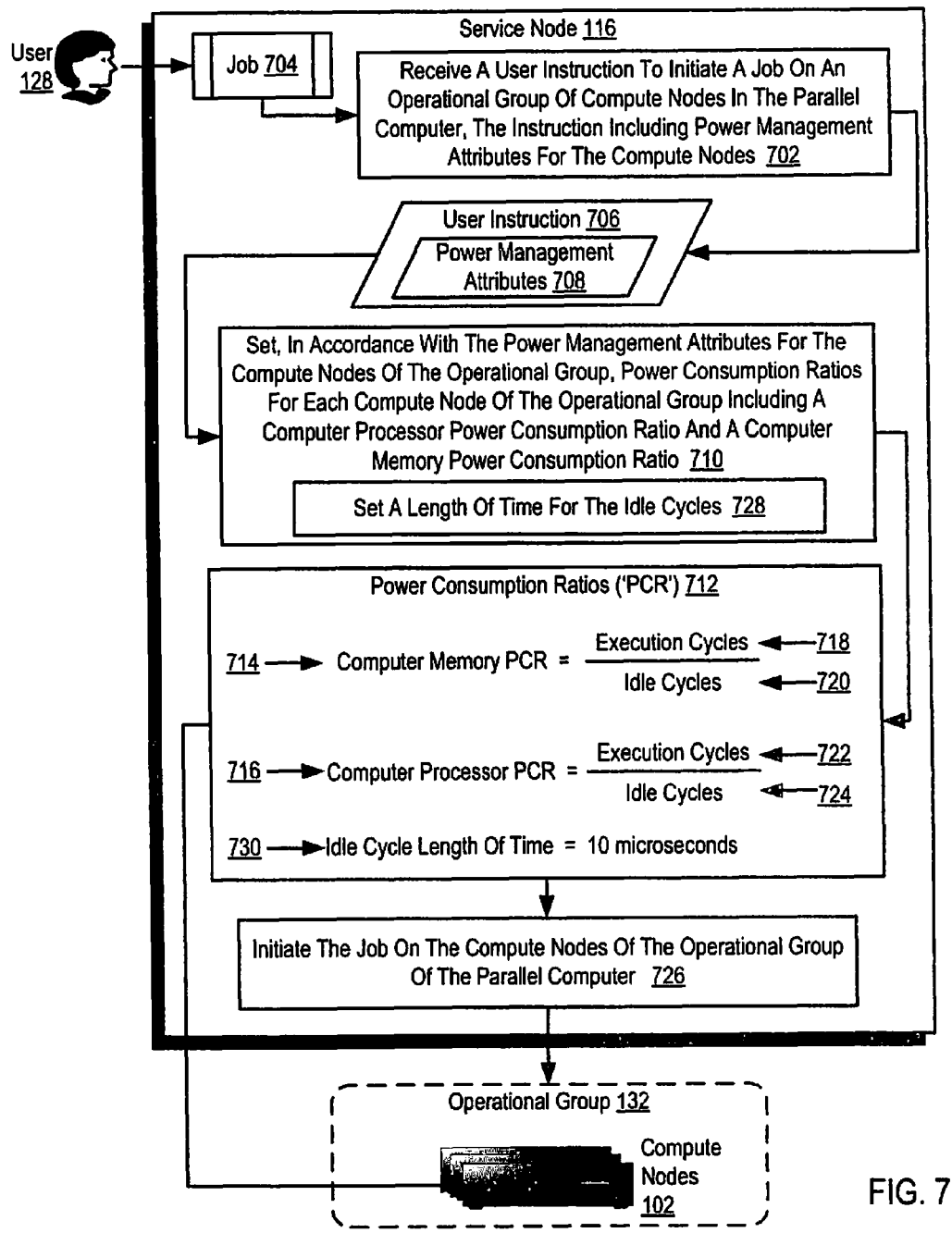
FIG. 7 sets forth a flow chart illustrating an exemplary method for proactive power management in a parallel computer according to embodiments of the present invention.

For further explanation, FIG. 7 sets forth a flow chart illustrating an exemplary method for proactive power management in a parallel computer according to embodiments of the present invention. The parallel computer includes a plurality of compute nodes (102) organized as an operational group (132). The parallel computer also includes a service node (116) connected to the compute nodes (102) through an out-of-band service network, such as a JTAG network (104 on FIG. 1). Each compute node (102) includes a computer processor and a computer memory operatively coupled to the computer processor. In some embodiments the plurality of compute nodes (102) are connected for data communications through a plurality of data communications networks. The plurality of data communications networks may include a data communications network optimized for point to point data communications (104 on FIG. 1). The plurality of data communications networks may also include a data communications network optimized for collective operations (106 on FIG. 1).

The method of FIG. 7 includes receiving (702), by the service node (116), a user instruction (706) to initiate a job (704) on an operational group (132) of compute nodes (102) in the parallel computer, the instruction (706) including power management attributes (708) for the compute nodes (102). Receiving (702), by the service node (116), a user instruction (706) to initiate a job (704) on an operational group (132) of compute nodes (102) in the parallel computer, the instruction (706) including power management attributes (708) for the compute nodes (102) includes, for example, receiving the power consumption ratios, including the execute cycles and idle cycles for the computer processor and computer memory power consumption ratios, as well as the length of time for the idle cycles.

Receiving (702) a user instruction (706) to initiate a job (704) on an operational group of compute nodes in the parallel computer (100) may be carried out by receiving the power management attributes, entered by the user (128) into a graphical user interface ('GUI') provided by the service application interface (126), from the terminal (122). Such a GUI may be specifically configured to accept a length of time for idle cycles in addition to a single ratio of execute cycles to idle cycles to be applied to both the computer processor and computer memory power consumption ratios. Alternatively the GUI may be specifically configured to accept a length of time for idle cycles in addition to two distinct ratios of execute cycles to idle cycles: one ratio to be set as the computer processor power consumption ratio and one ratio to be set as the computer memory power consumption ratio.

The method of FIG. 7 also includes setting (710), by the service node (116) in accordance with the power management attributes (708) for the compute nodes (102) of the operational group (132), power consumption ratios (712) for each compute node (102) of the operational group (132) including a computer processor power consumption ratio (716) and a computer memory power consumption ratio (714). Setting (710), by the service node (116) in accordance with the power management attributes (708) for the compute nodes (102) of the operational group (132), power consumption ratios (712) for each compute node (102) of the operational group (132) including a computer processor power consumption ratio (716) and a computer memory power consumption ratio (714) may be carried out by configuring each of the compute nodes (102) in the operational group (132) with the power consumption ratios. That is, configuring computer memory within each of the compute nodes with the power consumption ratios.

In the method of FIG. 7 the power consumption ratios (712) are expressed as a ratio of execution cycles (718, 722) to idle cycles (720, 724). An execution cycle is the period in which the computer memory or computer processor executes an instruction. That is, an execution cycle is the period in which the computer memory or computer processor is active. An idle cycle, in contrast, is a period in which the computer processor or computer memory is idle, that is, not executing any instruction. When idling, neither the computer processor nor the computer memory is consuming power. Consider as an example that the user (128) provided as power management attributes (708) the following power consumption ratios:

computer processor power consumption ratio=1/10
computer memory power consumption ratio=2/5

After the service node sets the power consumption ratios in the compute nodes and initiates the job on the compute nodes, the computer processor will execute instructions for one cycle then idle ten cycles. The computer memory will execute instructions for two cycles then idle five cycles.

In the method of FIG. 7, setting (710) the power consumption ratios (712) includes setting a length of time (730) for the idle cycles. Setting a length of time (730) for the idle cycles may be carried out by configuring the computer memory in each of the compute nodes with the length of time (730). The greater the length of time of an idle cycle the longer a computer processor or computer memory in a compute node idles during such an idle cycle. In the example of FIG. 7, the idle cycle length of time (730) is set to 10 microseconds. That is, each cycle that a computer processor or computer memory idles lasts 10 microseconds.

In the example of FIG. 7 the computer processor power consumption ratio (714) may equal the computer memory power consumption ratio (716). That is, a user may provide as part of the power management attributes (708) a single ratio for the two power consumption ratios (714, 716). Alternatively, a user may select a different ratio for each power consumption ratio. In such a case, the computer processor power consumption ratio (716) does not equal the computer memory power consumption ratio (714). Allowing a user to set the power consumption ratios (714, 716) distinctly enables precise control of power consumption in the parallel computer.

The method of FIG. 7 also includes initiating (726), by the service node (116), the job (704) on the compute nodes (102) of the operational group (132) of the parallel computer. Initiating (726) the job (704) on the compute nodes (102) may be carried out by configuring each compute node (102) in the operational group (132) with its job-specific computer program instructions and sending a notification to the compute nodes (102) in the operational group (132) to execute the computer program instructions.

Figure 8:
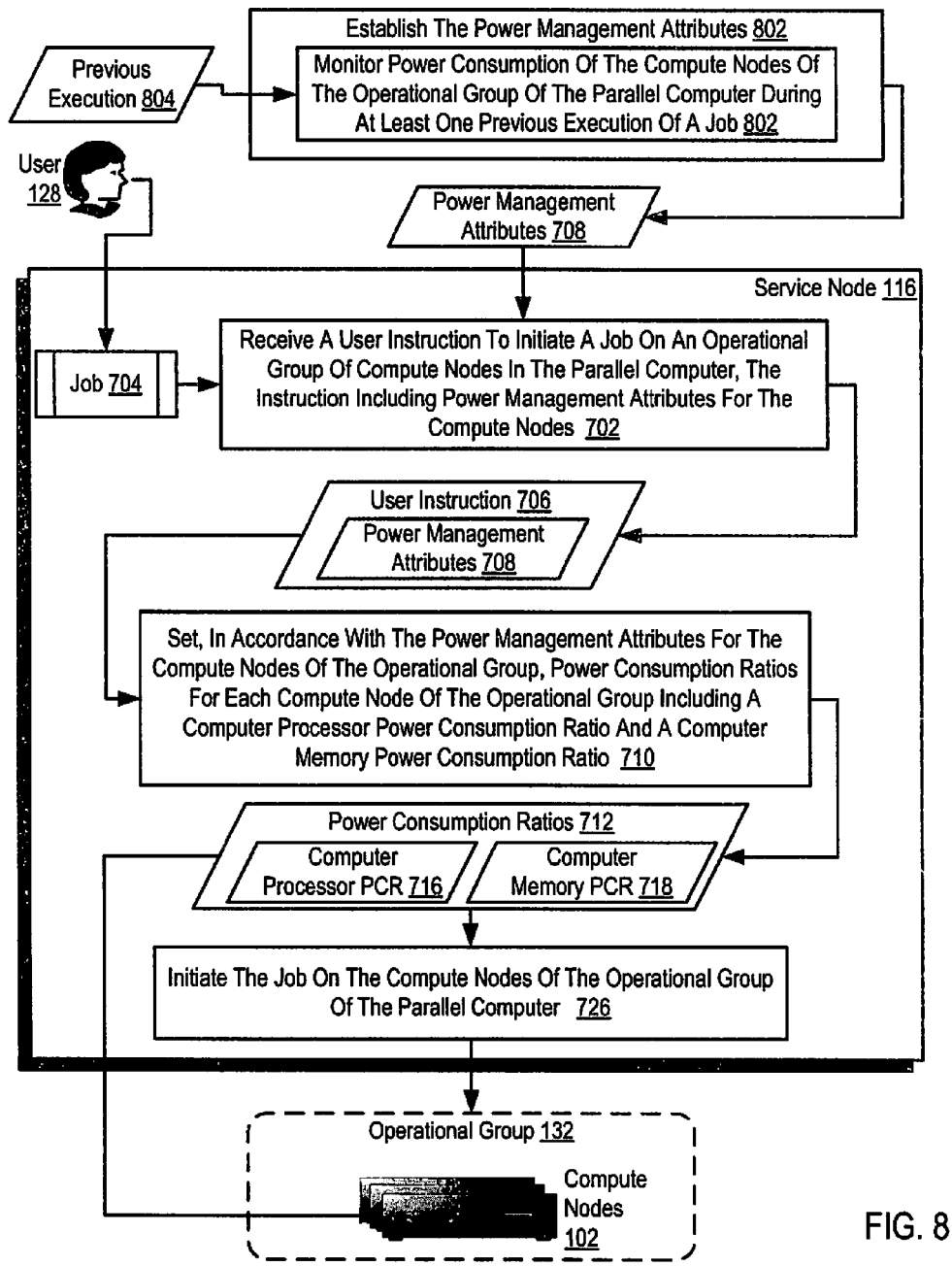
FIG. 8 sets forth a flow chart illustrating a further exemplary method for proactive power management in a parallel computer according to embodiments of the present invention.

For further explanation, FIG. 8 sets forth a flow chart illustrating a further exemplary method for proactive power management in a parallel computer according to embodiments of the present invention. The method of FIG. 8 is similar to the method of FIG. 7, in that the method of FIG. 8 includes receiving (702), by the service node (116), a user instruction (706) to initiate a job (704) on an operational group (132) of compute nodes (102) in the parallel computer, the instruction (706) including power management attributes (708) for the compute nodes (102); setting (710), by the service node (116) in accordance with the power management attributes (708) for the compute nodes (102) of the operational group (132), power consumption ratios (712) for each compute node (102) of the operational group (132) including a computer processor power consumption ratio (716) and a computer memory power consumption ratio (714); and initiating (726), by the service node (116), the job (704) on the compute nodes (102) of the operational group (132) of the parallel computer.

The method of FIG. 8 differs from the method of FIG. 7 in that the method of FIG. 8 also includes establishing (802), by a user (128), the power management attributes (708). In the method of FIG. 8 establishing (802) the power management attributes (708) is carried out by monitoring (802) power consumption of the compute nodes (102) of the operational group (132) of the parallel computer during at least one previous execution (804) of a job. Power management attributes are established to reduce the amount of power consumed by the parallel computer during the execution of the job to an amount below a predetermined threshold. Such a predetermined threshold in systems that proactively manage the power consumption of a parallel computer is typically the peak power, the amount of power at which electrical providers charge a customer higher rates. Although establishing the power consumption ratios is described here as a single step, readers of skill in the art will immediately recognize that users may monitor power consumption of the compute nodes during many job executions before establishing the power management attributes (708).

Exemplary embodiments of the present invention are described largely in the context of a fully functional computer system for proactive power management in a parallel computer. Readers of skill in the art will recognize, however, that the present invention also may be embodied in a computer program product disposed on signal bearing media for use with any suitable data processing system. Such signal bearing media may be transmission media or recordable media for machine-readable information, including magnetic media, optical media, or other suitable media. Examples of recordable media include magnetic disks in hard drives or diskettes, compact disks for optical drives, magnetic tape, and others as will occur to those of skill in the art. Examples of transmission media include telephone networks for voice communications and digital data communications networks such as, for example, Ethernets™ and networks that communicate with the Internet Protocol and the World Wide Web as well as wireless transmission media such as, for example, networks implemented according to the IEEE 802.11 family of specifications. Persons skilled in the art will immediately recognize that any computer system having suitable programming means will be capable of executing the steps of the method of the invention as embodied in a program product. Persons skilled in the art will recognize immediately that, although some of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of proactive power management in a parallel computer, the parallel computer comprising a service node and a plurality of compute nodes, the service node connected to the compute nodes through an out-of-band service network, each compute node comprising a computer processor and a computer memory operatively coupled to the computer processor, the method comprising:
    receiving, by the service node, a user instruction to initiate a job on an operational group of compute nodes in the parallel computer, the instruction including power management attributes for the compute nodes;
    setting, by the service node in accordance with the power management attributes for the compute nodes of the operational group, power consumption ratios for each compute node of the operational group including a computer processor power consumption ratio and a computer memory power consumption ratio; and
    initiating, by the service node, the job on the compute nodes of the operational group of the parallel computer.

2. The method of claim 1 wherein the power consumption ratios further comprises a ratio of execution cycles to idle cycles.

3. The method of claim 2 wherein setting power consumption ratios further comprises setting a length of time for the idle cycles.

4. The method of claim 1 wherein the computer processor power consumption ratio is equal to the computer memory power consumption ratio.

5. The method of claim 1 wherein the computer processor power consumption ratio is not equal to the computer memory power consumption ratio.

6. The method of claim 1 further comprising establishing, by a user, the power management attributes including monitoring power consumption of the compute nodes of the operational group of the parallel computer during at least one previous execution of a job.

7. The method of claim 1 wherein the plurality of compute nodes are connected for data communications through a plurality of data communications networks at least one data communications network optimized for point to point data communications and at least one data communications network optimized for collective operations.

8. A service node for proactive power management in a parallel computer, the parallel computer comprising the service node and a plurality of compute nodes, the service node connected to the compute nodes through an out-of-band service network, each compute node comprising a computer processor and a computer memory operatively coupled to the computer processor, the service node comprising a computer processor and computer memory operatively coupled to the computer processor, the computer memory having disposed within it computer program instructions that, when executed by the computer processor of the service node, cause the service node to carry out the steps of:

receiving, by the service node, a user instruction to initiate a job on an operational group of compute nodes in the parallel computer, the instruction including power management attributes for the compute nodes;

setting, by the service node in accordance with the power management attributes for the compute nodes of the operational group, power consumption ratios for each compute node of the operational group including a computer processor power consumption ratio and a computer memory power consumption ratio; and initiating, by the service node, the job on the compute nodes of the operational group of the parallel computer.

9. The service node of claim 8 wherein the power consumption ratios further comprises a ratio of execution cycles to idle cycles.

10. The service node of claim 9 wherein setting power consumption ratios further comprises setting a length of time for the idle cycles.

11. The service node of claim 8 wherein the computer processor power consumption ratio is equal to the computer memory power consumption ratio.

12. The service node of claim 8 wherein the computer processor power consumption ratio is not equal to the computer memory power consumption ratio.

13. The service node of claim 8 further comprising computer program instructions that, when executed by the computer processor of the service node, cause the service node to carry out the step of establishing, by a user, the power management attributes including monitoring power consumption of the compute nodes of the operational group of the parallel computer during at least one previous execution of a job.

14. The service node of claim 8 wherein the plurality of compute nodes are connected for data communications through a plurality of data communications networks at least one data communications network optimized for point to point data communications and at least one data communications network optimized for collective operations.

15. A computer program product for proactive power management in a parallel computer, the parallel computer comprising a service node and a plurality of compute nodes, the service node connected to the compute nodes through an out-of-band service network, each compute node comprising a computer processor and a computer memory operatively coupled to the computer processor, the service node comprising a computer processor and computer memory operatively coupled to the computer processor, the computer program product disposed in a computer readable, recordable storage medium, the computer program product comprising computer program instructions that, when executed by the computer processor of the service node, cause the service node to carry out the steps of:

receiving, by the service node, a user instruction to initiate a job on an operational group of compute nodes in the parallel computer, the instruction including power management attributes for the compute nodes;

setting, by the service node in accordance with the power management attributes for the compute nodes of the operational group, power consumption ratios for each compute node of the operational group including a computer processor power consumption ratio and a computer memory power consumption ratio; and initiating, by the service node, the job on the compute nodes of the operational group of the parallel computer.

16. The computer program product of claim 15 wherein the power consumption ratios further comprises a ratio of execution cycles to idle cycles.

17. The computer program product of claim 16 wherein setting power consumption ratios further comprises setting a length of time for the idle cycles.

18. The computer program product of claim 15 wherein the computer processor power consumption ratio is equal to the computer memory power consumption ratio.

19. The computer program product of claim 15 wherein the computer processor power consumption ratio is not equal to the computer memory power consumption ratio.

20. The computer program product of claim 15 further comprising computer program instructions that, when executed by the computer processor of the service node, causes the service node to carry out the step of establishing, by a user, the power management attributes including monitoring power consumption of the compute nodes of the operational group of the parallel computer during at least one previous execution of a job.

21. The computer program product of claim 15 wherein the plurality of compute nodes are connected for data communications through a plurality of data communications networks at least one data communications network optimized for point to point data communications and at least one data communications network optimized for collective operations.

* * * * *